United States Patent

Montalban

[19]

[11] Patent Number: 6,152,562
[45] Date of Patent: Nov. 28, 2000

[54] ELASTIC HINGE FOR EYEGLASSES

[75] Inventor: Rinaldo Montalban, Venice, Italy

[73] Assignee: Visottica S.p.A., Susegana, Italy

[21] Appl. No.: 09/142,738

[22] PCT Filed: Jan. 23, 1998

[86] PCT No.: PCT/EP98/00368

§ 371 Date: Sep. 18, 1998

§ 102(e) Date: Sep. 18, 1998

[87] PCT Pub. No.: WO98/33087

PCT Pub. Date: Jul. 30, 1998

[30] Foreign Application Priority Data

Jan. 29, 1997 [IT] Italy ................................. PD97A0011

[51] Int. Cl.[7] ................................................. G02C 5/22
[52] U.S. Cl. .............................. 351/153; 351/113; 16/228
[58] Field of Search ................................. 351/111, 113, 351/114, 119, 121, 153; 16/228

[56] References Cited

U.S. PATENT DOCUMENTS 5,400,090 3/1995 Chen ....................................... 351/153
5,406,339 4/1995 Chen ....................................... 351/153

FOREIGN PATENT DOCUMENTS 2664990 1/1992 France .
WO96/37801 11/1996 WIPO .

*Primary Examiner*—Huy Mai
*Attorney, Agent, or Firm*—Guido Modiano; Albert Josif

[57] ABSTRACT

An elastic hinge for eyeglasses comprising, at the end of a temple, an eyelet-shaped element suitable to engage, by means of an articulation pivot, two elements having the same structure and protruding from the front. Starting from the eyelet-shaped element, the following elements are assembled in sequence on the temple: a slider with a spoon-shaped end; an elastic element; and a contrast element which extends with a hollow structure so as to conceal the elastic element and at least partially conceal the slider. An annular locking element is at least partially interposed between annular abutment regions of the contrast element and of the temple, is inserted from the free end of the temple and can be deformed elastically with its locking parts so as to move beyond the abutment region of the temple.

7 Claims, 2 Drawing Sheets

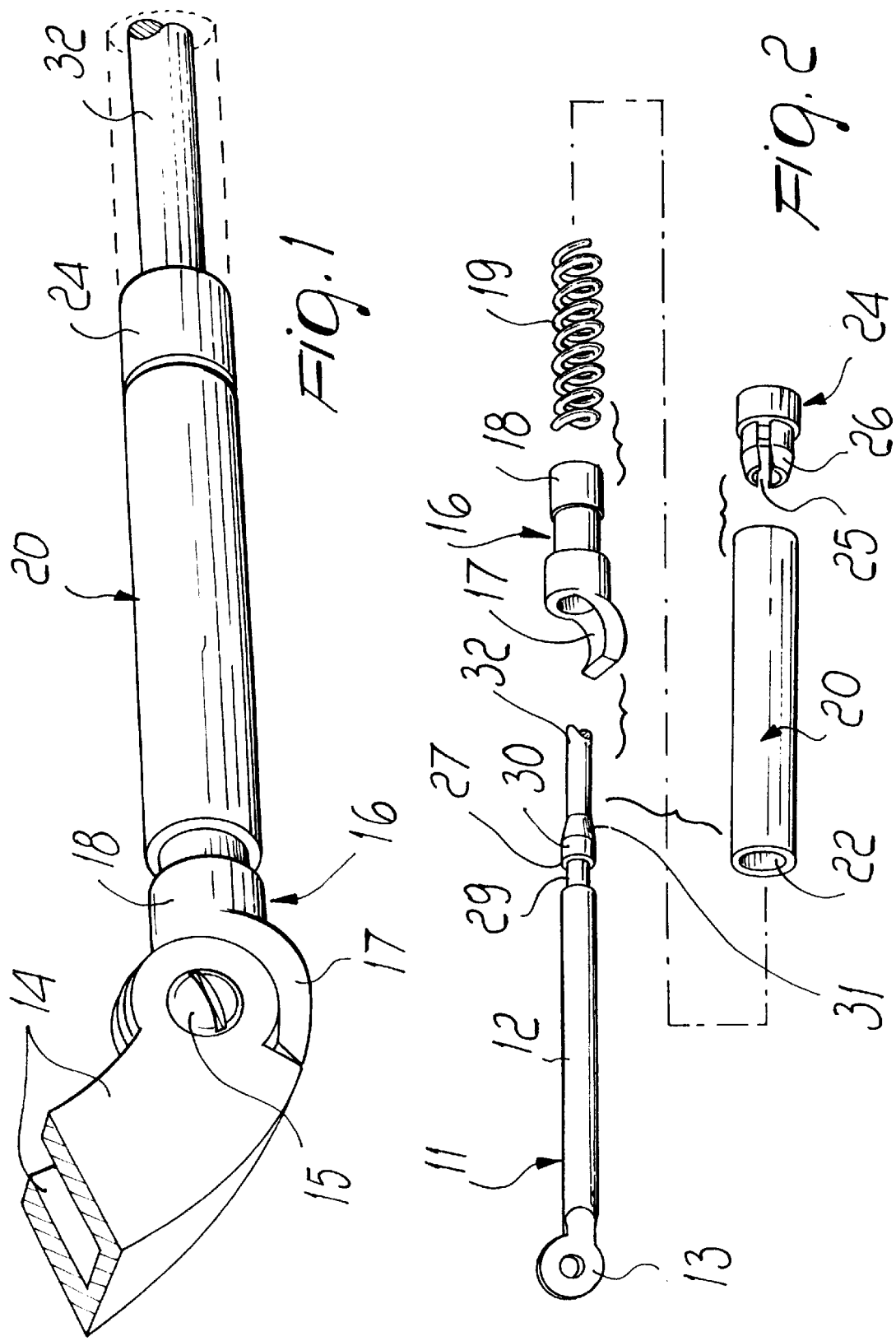

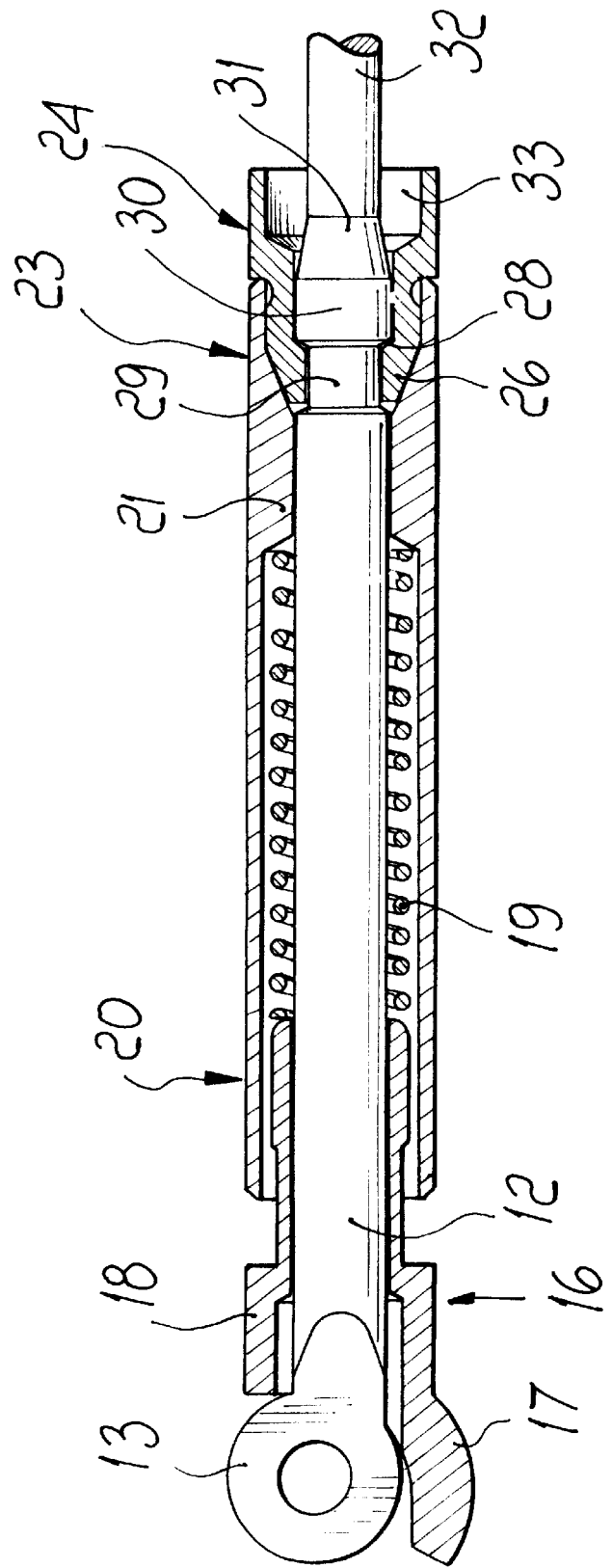

ELASTIC HINGE FOR EYEGLASSES

BACKGROUND OF THE INVENTION

The present invention relates to an elastic hinge for eyeglasses.

It is well-known that elastic hinges for eyeglasses are currently commercially available which have temples provided, at the hinge engagement ends, with an eyelet-shaped element which in turn engages two other mutually parallel elements which have the same eyelet-like shape and protrude from the front of the eyeglasses.

The articulation of each hinge is provided by means of a pivot which engages the eyelet-shaped elements of the front of the eyeglasses, between which the eyelet-shaped element of the temple is arranged.

The temple is usually also provided with a slider which is characterized by a substantially cylindrical body having a spoon-shaped end.

The slider is arranged so that its spoon-shaped end abuts against the eyelet-shaped elements of the front through the action of a spring.

The spring is usually accommodated inside an elongated hollow body which is fitted on the temple.

The elongated hollow body constitutes an element for protecting the spring, which thus remains invisible from outside, and at the same time acts as a contrast element for the spring, so that the spring makes the slider abut against the eyelet-shaped element of the temple.

The elongated hollow body must be fixed to the temple.

The difference among the various kinds of elastic hinge that are currently commercially available is substantially due to the method used to lock the elongated hollow body to the temple.

The hollow body is currently fixed to the temple, in any applications, by welding or gluing.

However, in practical execution there are difficulties linked to the time and precision required by such a process.

In the production of elastic hinges there are in fact complications in terms of construction and process which cause severe slowing due to the difficulty of welding or gluing the elongated hollow body to the temple.

These limitations are observed most of all in the case of hinges obtained with metal temples, since the temples are usually smaller than the others.

In particular, it should be noted that welding operations must be particularly precise and accurate to avoid affecting the aesthetic characteristics of the eyeglasses.

There are also other solutions, in which the hollow body is fixed to the temple by means of a first threaded portion, formed inside said hollow body, and a second threaded portion, which is shaped complementarily to the first portion and is formed along the temple.

However, also this entails a particularly precise and highly accurate process, which is difficult to manage in view of the size of the temples and of the precision required for production.

In addition to the above-mentioned types, there is a type of eyeglasses in which the elongated hollow body is fixed to the temple by mechanical action.

In this type of eyeglasses, the hollow body is locked in its sliding along the temple by means of a compression, performed for example with a punching machine, which deforms and flattens it.

In this case too, however, production complexities are not eliminated.

SUMMARY OF THE INVENTION

The aim of the present invention is to provide an elastic hinge for eyeglasses which eliminates all the drawbacks mentioned above of conventional types.

Within the scope of this aim, a particular object of the present invention is to provide an elastic hinge for eyeglasses which allows permanent assembly of all the components of the elastic hinge without requiring welding or particular machining operations.

Another object of the present invention is to provide an elastic hinge for eyeglasses which can be manufactured with a limited number of components.

Another important object of the present invention is to provide an elastic hinge for eyeglasses which allows to assemble all the components with a small number of operations.

Another important object of the present invention is to provide an elastic hinge for eyeglasses whose structure is simple and can be easily adapted to temples having different cross-sections.

Another object of the present invention is to provide an elastic hinge for eyeglasses which can be manufactured with conventional technologies and without having to resort to particular equipment or facilities.

Another object of the present invention is to provide an elastic hinge for eyeglasses having a considerable aesthetic value.

This aim, these objects and others which will become apparent hereinafter are achieved by an elastic hinge for eyeglasses comprising, at the end of a temple, an eyelet-shaped element which is suitable to engage, by means of an articulation pivot, two elements which have the same structure and protrude from the front, a slider with a spoon-shaped end, an elastic element, and a contrast element, which extends with a hollow structure so as to conceal said elastic element and at least partially conceal said slider, being assembled in sequence on said temple starting from said eyelet-shaped element, characterized in that an annular locking element is at least partially interposed between annular abutment regions of said contrast element and of said temple, is inserted from the free end of said temple and can be deformed elastically with its locking parts so as to move beyond the abutment region of said temple.

BRIEF DESCRIPTION OF THE DRAWINGS

Further characteristics and advantages of the present invention will become apparent from the following detailed description of a preferred embodiment thereof, illustrated only by way of non-limitative example in the accompanying drawings, wherein:

FIG. 1 is a perspective view of an elastic hinge according to the present invention;

FIG. 2 is an exploded perspective view of the assembly sequence of the components of an elastic hinge according to the present invention;

FIG. 3 is a sectional view of an elastic hinge according to the present invention.

DESCRIPTION OF THE PREFERRED EMBODIMENTS

With reference to the above figures, an elastic hinge for eyeglasses, according to the present invention, is formed by a temple 11 which is assembled at one of its ends 12.

An eyelet-shaped element 13 is monolithic with said end 12, protrudes therefrom and is suitable to engage two eyelet-shaped elements 14, which are parallel, have the same dimensions and protrude from the front of the eyeglasses, by means of a threaded pivot 15 for engagement, in a per se known manner, for example with a complementarily shaped fixing nut, in the eyelets 13 and 14 so as to form the hinge.

A slider 16 is fitted on the end 12 of the temple 11 and abuts against the eyelet-shaped elements 14 of the front.

The slider 16 has a substantially cylindrical structure which has a cup-shaped end 17, which follows the profile of the eyelet-shaped element 13 in a per se known manner, and a body 18, against which a helical spring 19 abuts.

The helical spring 19 is arranged so as to wrap around the temple 11.

The temple also has a contrast element 20 which is substantially constituted by an elongated hollow body which has, at an end lying opposite to the hinge engagement end, a perforated bottom 21 and inside which a cavity 22 is formed axially, the cavity being suitable to accommodate the temple 11 and contain the helical spring 19.

The two ends of the helical spring 19 push against the body 18 of the slider 16, at one end, and against the perforated bottom 21 of the contrast element 20 at the other end.

Said contrast element 20 also has a portion which protrudes from the perforated bottom 21 and forms a substantially funnel-shaped seat 23 which is shaped complementarily to a locking element 24.

The locking element 24 is substantially a plug axially provided with a bush 25 and, at the end for engaging the contrast element 20, with two engagement flaps 26 which are substantially constituted by teeth suitable to anchor, by elastic deformation, to the temple 11 at an annular step 27.

In particular, the bush 25 forms, in this particular constructive configuration, starting from the region for locking against the contrast element 20, an internal expansion 28 so as to form the hollow for the grip of the engagement flaps 26.

The temple 11 in fact forms, along its extension, starting from the end 12 and in a region which is proximate to the seat 23 of the contrast element 20, a smaller sector 29 and a contiguous raised sector 30.

The smaller sector 29 consists of a diametrical narrowing of the temple 11, while the raised sector 30 is constituted by a diametrical expansion of the temple 11 so as to substantially form the annular step 27.

The temple 11 continues with a tapering portion 31 which forms a region 32 which is smaller than the end 12.

The locking element 24, in this particular constructive configuration, has a recess 33 at the region directed towards the smaller region 32 of the temple 11.

The region 32 can constitute a conventional core of a plastic sheath (shown in dashed lines in FIG. 1).

The hinge is assembled starting from the temple 11, on which the following components are threaded in sequence starting from the free end: the slider 16, so that the spoon-shaped end 17 abuts against the eyelet-shaped elements 14 of the front; the helical spring 19; the contrast element 20; and, finally, the locking element 24.

The helical spring 19 is fully concealed by the contrast element 20 that covers it.

The locking element 24 can be threaded from the free end of the temple 11 and can slide freely along the smaller region 32 of the temple 11.

The recess 33 forms, in combination with the smaller region 32 of the temple 11, which constitutes the core of a plastic sheath, the seat for the trimming of the sheath.

Finally, after preparing the slider 16 and the helical spring 19 on the temple 11, the contrast element 20 is arranged so as to cover said helical spring 19, pushing it towards the eyelet-shaped element 13, so as to load the helical spring 19 against the body 18 of the slider 16 and thus make the spoon-shaped end 17 abut against said eyelet-shaped elements 14 of the front.

Finally, the contrast element 20 is fixed in the active position by applying the locking element 24, which anchors by elastic deformation with its engagement flaps 26 at the annular step 27.

In this manner, the contrast element 20, and accordingly the helical spring 19, rest stably against the locking element 24.

The annular step 27 is preferably provided by means of a hammering operation applied to the temple 11 according to conventional methods.

Finally, the tapering region 31 and the smaller region 32 of the temple 11 are provided by turning with conventional machines and processes.

In a different embodiment, the locking element 24 can have, at the end lying opposite to the locking end, a portion which tapers to the region 32 of the temple 11, so as to constitute a variation for the aesthetic finish of the eyeglasses.

In practice, it is evident that the present invention amply achieves the aim and all of the intended objects.

In particular, an important advantage is achieved with the present invention in that an elastic hinge for eyeglasses has been perfected which allows permanent assembly of all its components without requiring weldings or particular processes.

Another advantage is ensured by the present invention in that an elastic hinge for eyeglasses is provided which can be manufactured with a limited number of components.

Another advantage is achieved by the present invention as regards the fact that an elastic hinge for eyeglasses has been perfected which has a simple structure and can be easily adapted to temples having different cross-sections.

Another advantage is achieved by the present invention in that an elastic hinge for eyeglasses has been provided which can be produced in practice according to conventional technologies and without having to resort to particular equipment or special machinery.

Another advantage is ensured by the present invention in relation to the achieved improvement of an elastic hinge for eyeglasses which is pleasant and very effective aesthetically.

Another advantage is achieved by the present invention in that an elastic hinge for eyeglasses has been provided which can be assembled with a limited number of operations and according to a process which can be performed easily.

Another advantage is achieved by the present invention in that an elastic hinge for eyeglasses has been provided which can be obtained with low manufacturing costs.

In practice, the present invention is susceptible of numerous modifications and variations, all of which are within the scope of the same inventive concept.

All the details may also be replaced with other technically equivalent elements.

The materials employed, as well as the dimensions, may be any according to requirements.

What is claimed is:

1. An elastic hinge for eyeglasses comprising, at the end of a temple, an eyelet-shaped element suitable to engage, by means of an articulation pivot, two elements which have the same structure and protrude from the front of said eyeglasses, a slider with a spoon-shaped end, an elastic element, and a contrast element, which extends with a hollow structure so as to conceal said elastic element and at least partially conceal said slider, being assembled in sequence on said temple starting from said eyelet-shaped element, and wherein an annular locking element, which comprises locking parts is at least partially interposed between annular abutment regions of said contrast element and of said temple, is inserted from the free end of said temple and can be deformed elastically with said locking parts so as to move beyond the abutment region of said temple.

2. The elastic hinge for eyeglasses, according to claim 1, wherein said locking parts of said locking element comprise at least two teeth for engaging, by elastic deformation, an annular step of said temple which constitutes said abutment region.

3. The elastic hinge for eyeglasses, according to claim 2, wherein said temple has, along its extension, starting from the eyelet-shaped element, said annular step and a contiguous tapering portion so as to form said free end.

4. The elastic hinge for eyeglasses, according to claim 3, wherein said contrast element, inserted from the free end on said temple, has an elongated hollow body with a bottom adapted to compress said elastic element against said slider, said bottom being perforated in order to allow the temple to pass.

5. The elastic hinge for eyeglasses according to claim 2, wherein said contrast element comprises an end which is shaped complementarily to said engagement teeth of said locking element, said end extending so as to at least partially conceal said engagement teeth.

6. The elastic hinge for eyeglasses according to claim 5, wherein said locking element axially forms a bush which has, along its extension starting from the engagement teeth, an internal expansion which is shaped complementarily to said annular step, said temple being inserted in said bush so as to increase the anchoring of said engagement teeth.

7. The elastic hinge for eyeglasses according to claim 2, wherein said locking element has, at the end opposite to the end provided with said engagement teeth, a recess adapted to constitute the trimming seat of a plastic sheath of the free end of said temple.

\* \* \* \* \*